United States Patent
Harrold et al.

(10) Patent No.: US 8,179,426 B2
(45) Date of Patent: May 15, 2012

(54) PIXEL ARRANGEMENT FOR AN AUTOSTEREOSCOPIC DISPLAY APPARATUS

(75) Inventors: Jonathan Harrold, Warwick (GB); Graham John Woodgate, Henley-on-Thames (GB)

(73) Assignee: AU Optronics Corp., Hsinchu (TW)

( * ) Notice: Subject to any disclaimer, the term of this patent is extended or adjusted under 35 U.S.C. 154(b) by 1487 days.

(21) Appl. No.: 10/563,121

(22) PCT Filed: Jul. 9, 2004

(86) PCT No.: PCT/GB2004/002975
§ 371 (c)(1),
(2), (4) Date: Jan. 3, 2006

(87) PCT Pub. No.: WO2005/006777
PCT Pub. Date: Jan. 20, 2005

(65) Prior Publication Data
US 2006/0164528 A1    Jul. 27, 2006

(30) Foreign Application Priority Data
Jul. 10, 2003    (GB) .................................. 0316221.1

(51) Int. Cl.
*H04N 13/04*    (2006.01)
(52) U.S. Cl. ........................................ 348/51
(58) Field of Classification Search .............. 348/51; 349/15, 123
See application file for complete search history.

(56) References Cited
U.S. PATENT DOCUMENTS
5,953,148 A * 9/1999 Moseley et al. ............. 359/237
2002/0126389 A1  9/2002 Moseley et al.

FOREIGN PATENT DOCUMENTS
| EP | 0 625 861 A2 | 11/1994 |
| EP | 0 829 743 A2 | 3/1998 |
| EP | 0 833 184 A1 | 4/1998 |
| WO | WO 03/015424 A2 | 2/2003 |

OTHER PUBLICATIONS

Eichenlaub, Jesse B., "Developments in Autostereoscopic Technology at Dimension Technologies Inc.", 1993, Proc. of SPIE, vol. 1915, Stereoscopic Displays and Applications IV, pp. 177-186.

* cited by examiner

*Primary Examiner* — Jason Chan
*Assistant Examiner* — Gary C Vieaux
(74) *Attorney, Agent, or Firm* — Thomas, Kayden, Horstemeyer & Risley, LLP

(57) ABSTRACT

An autostereoscopic display apparatus comprises a spatial light modulator comprising an array of pixels arranged in rows and columns in a pixel plane, and a spatially multiplexing parallax element capable of directing light from successive columns of pixels towards successive ones of two or more viewing windows in a nominal window plane. The pixels comprise pixel apertures having gaps therebetween with the gaps between the columns of pixels extending substantially parallel to the columns of pixels. The arrangement of the pixels is designed taking account of the intensity profile of an image of a nominal human pupil in the nominal window plane formed in the pixel plane by the spatially multiplexing parallax element to reduce the amount of spatially derived flicker observed by a viewer moving in the window plane. In one arrangement, the pixel apertures repeat at a pitch equal to a representative width of said intensity profile. In another arrangement, the total height of the pixel apertures parallel to the columns of pixels has a profile which increases towards the edges of the pixel apertures relative to the centre of the pixel apertures.

16 Claims, 12 Drawing Sheets

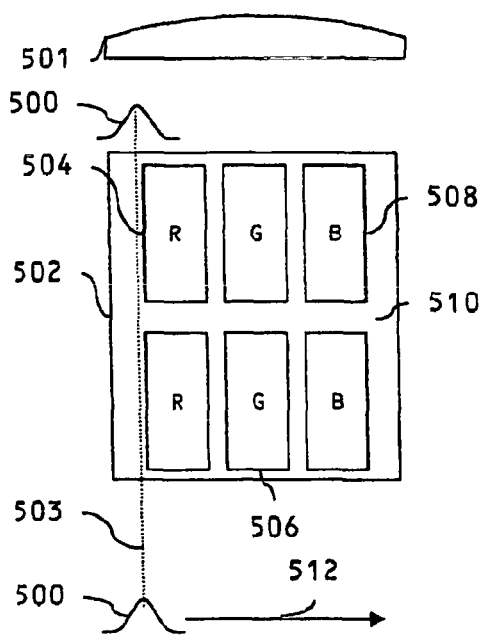
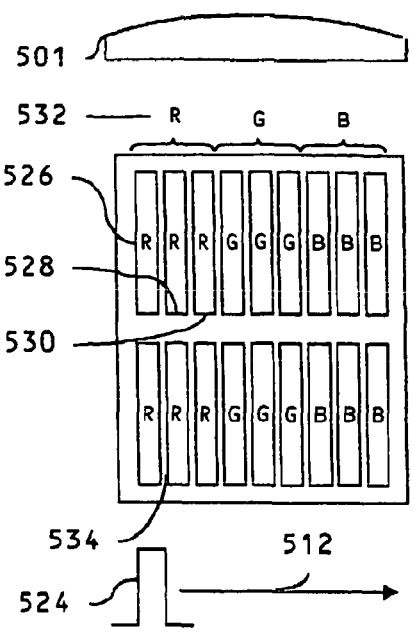
FIG.11a (Prior Art)          FIG.12a
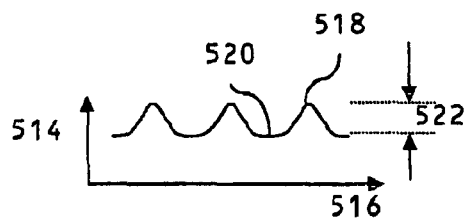
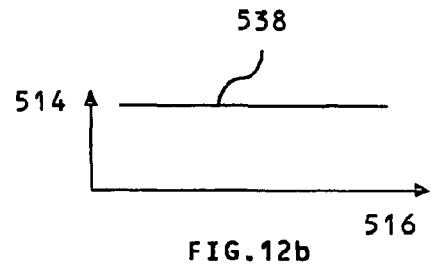
FIG.11b (Prior Art)          FIG.12b
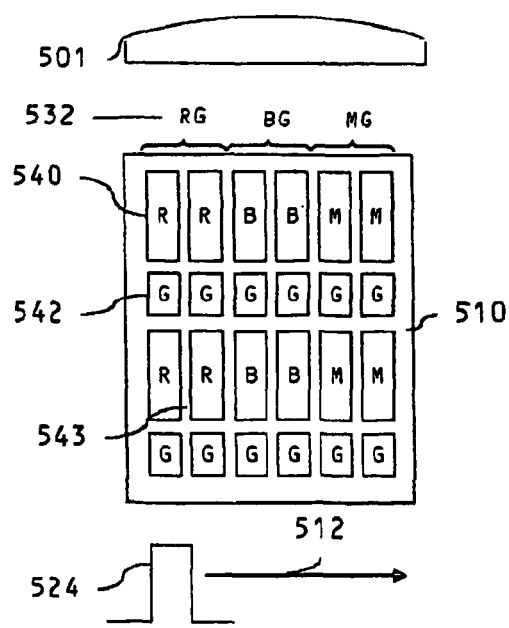
FIG.13

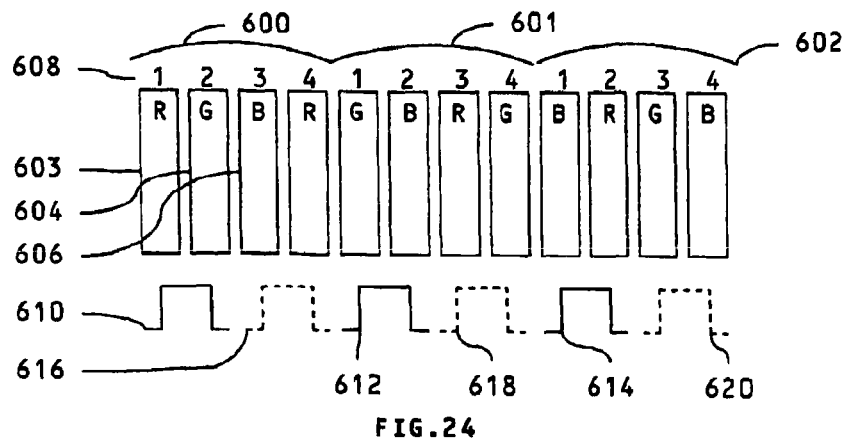
FIG. 24
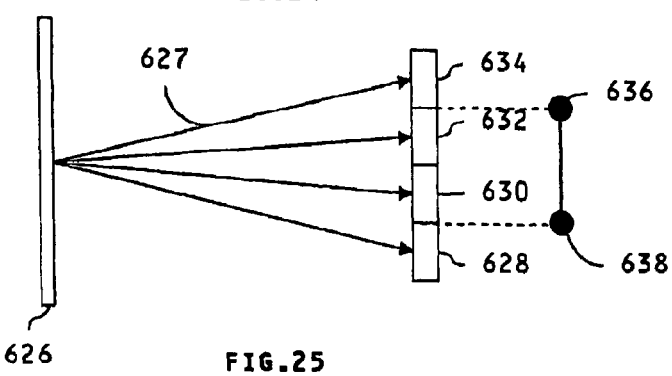
FIG. 25
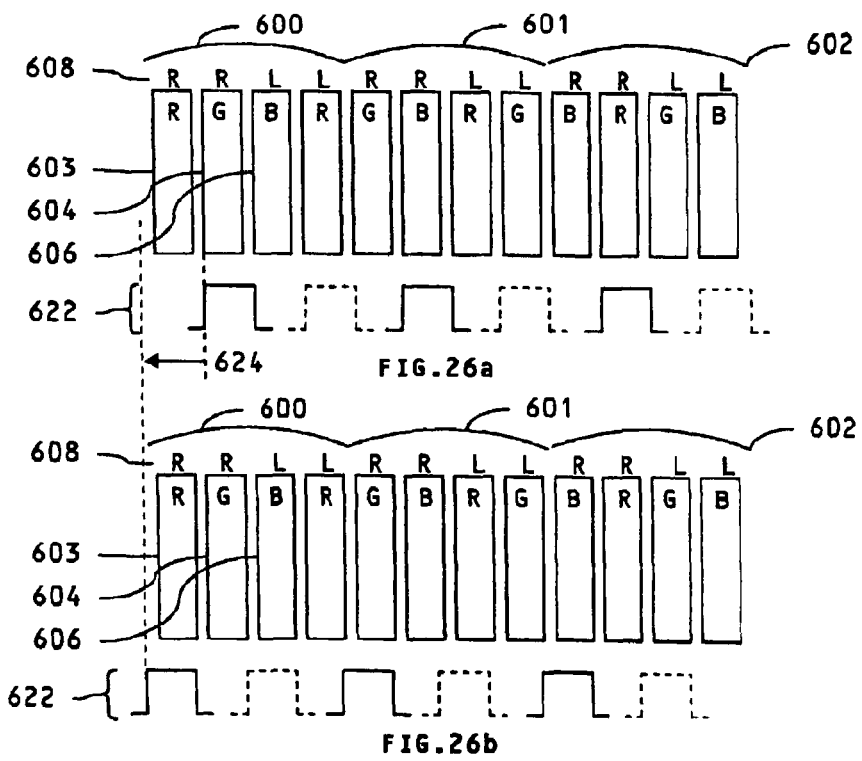
FIG. 26a
FIG. 26b

PIXEL ARRANGEMENT FOR AN AUTOSTEREOSCOPIC DISPLAY APPARATUS

The present invention relates to an autostereoscopic display apparatus. Such an apparatus may be used in a switchable two dimensional (2D)/three dimensional (3D) autostereoscopic display apparatus. Such systems may be used in computer monitors, telecommunications handsets, digital cameras, laptop and desktop computers, games apparatuses, automotive and other mobile display applications.

Normal human vision is stereoscopic, that is each eye sees a slightly different image of the world. The brain fuses the two images (referred to as the stereo pair) to give the sensation of depth. Three dimensional stereoscopic displays replay a separate, generally planar, image to each of the eyes corresponding to that which would be seen if viewing a real world scene. The brain again fuses the stereo pair to give the appearance of depth in the image.

FIG. 1a shows in plan view a display surface in a display plane 1. A right eye 2 views a right eye homologous image point 3 on the display plane and a left eye 4 views a left eye homologous point 5 on the display plane to produce an apparent image point 6 perceived by the user behind the screen plane.

FIG. 1b shows in plan view a display surface in a display plane 1. A right eye 2 views a right eye homologous image point 7 on the display plane and a left eye 4 views a left eye homologous point 8 on the display plane to produce an apparent image point 9 in front of the screen plane.

FIG. 1c shows the appearance of the left eye image 10 and right eye image 11. The homologous point 5 in the left eye image 10 is positioned on a reference line 12. The corresponding homologous point 3 in the right eye image 11 is at a different relative position 3 with respect to the reference line 12. The separation 13 of the point 3 from the reference line 12 is called the disparity and in this case is a positive disparity for points which will lie behind the screen plane.

For a generalised point in the scene there is a corresponding point in each image of the stereo pair as shown in FIG. 1a. These points are termed the homologous points. The relative separation of the homologous points between the two images is termed the disparity; points with zero disparity correspond to points at the depth plane of the display. FIG. 1b shows that points with uncrossed disparity appear behind the display and FIG. 1c shows that points with crossed disparity appear in front of the display. The magnitude of the separation of the homologous points, the distance to the observer, and the observer's interocular separation gives the amount of depth perceived on the display.

Stereoscopic type displays are well known in the prior art and refer to displays in which some kind of viewing aid is worn by the user to substantially separate the views sent to the left and right eyes. For example, the viewing aid may be colour filters in which the images are colour coded (e.g. red and green); polarising glasses in which the images are encoded in orthogonal polarisation states; or shutter glasses in which the views are encoded as a temporal sequence of images in synchronisation with the opening of the shutters of the glasses.

Autostereoscopic displays operate without viewing aids worn by the observer. In autostereoscopic displays, each of the views can be seen from a limited region in space as illustrated in FIG. 2.

FIG. 2a shows a display device 16 with an attached parallax optical element 17. The display device produces a right eye image 18 for the right eye channel. The parallax optical element 17 directs light in a direction shown by the arrow 19 to produce a right eye viewing window 20 in the region in front of the display. An observer places their right eye 22 at the position of the window 20. The position of the left eye viewing window 24 is shown for reference. The viewing window 20 may also be referred to as a vertically extended optical pupil.

FIG. 2b shows the left eye optical system. The display device 16 produces a left eye image 26 for the left eye channel. The parallax optical element 17 directs light in a direction shown by the arrow 28 to produce a left eye viewing window 30 in the region in front of the display. An observer places their left eye 32 at the position of the window 30. The position of the right eye viewing window 20 is shown for reference.

The system comprises a display and an optical steering mechanism. The light from the left image 26 is sent to a limited region in front of the display, referred to as the viewing window 30. If an eye 32 is placed at the position of the viewing window 30 then the observer sees the appropriate image 26 across the whole of the display 16. Similarly the optical system sends the light intended for the right image 18 to a separate window 20. If the observer places their right eye 22 in that window then the right eye image will be seen across the whole of the display. Generally, the light from either image may be considered to have been optically steered (i.e. directed) into a respective directional distribution.

FIG. 3 shows in plan view a display device 16,17 in a display plane 34 producing the left eye viewing windows 36,37,38 and right eye viewing windows 39,40,41 in the window plane 42. The separation of the window plane from the display is termed the nominal viewing distance 43. The windows 37,40 in the central position with respect to the display are in the zeroth lobe 44. Windows 36,39 to the right of the zeroth lobe 44 are in the +1 lobe 46, while windows 38,41 to the left of the zeroth lobe are in the −1 lobe 48.

The viewing window plane of the display represents the distance from the display at which the lateral viewing freedom is greatest. For points away from the window plane, there is a diamond shaped autostereoscopic viewing zone, as illustrated in plan view in FIG. 3. As can be seen, the light from each of the points across the display is beamed in a cone of finite width to the viewing windows. The width of the cone may be defined as the angular width.

If an eye is placed in each of a pair viewing zones such as 37,40 then an autostereoscopic image will be seen across the whole area of the display. To a first order, the longitudinal viewing freedom of the display is determined by the length of these viewing zones.

The variation in intensity 50 across the window plane of a display (constituting one tangible form of a directional distribution of the light) is shown with respect to position 51 for idealised windows in FIG. 4a. The right eye window position intensity distribution 52 corresponds to the window 41 in FIG. 3, and intensity distribution 53 corresponds to the window 37, intensity distribution 54 corresponds to the window 40 and intensity distribution 55 corresponds to the window 36.

FIG. 4b shows the intensity distribution with position schematically for more realistic windows. The right eye window position intensity distribution 56 corresponds to the window 41 in FIG. 3, and intensity distribution 57 corresponds to the window 37, intensity distribution 58 corresponds to the window 40 and intensity distribution 59 corresponds to the window 36.

The optical system serves to generate a directional distribution of the illumination at a window plane at a defined distance from the display. The variation in intensity across the window plane of a display constitutes one tangible form of a directional distribution of the light.

The respective images are displayed at the display plane, and observed by an observer at or near the window plane. The variation in intensity across the window plane is not defined by the variation in intensity across the image; however the image seen by an observer at the window plane may be referred to as the image at the viewing window for ease of explanation.

In this application the term "SLM" (Spatial Light Modulator) is used to include devices which modulate the transmitted or reflected intensity of an external light source, examples of which include Liquid Crystal Displays, and also devices which generate light themselves, examples of which include Electroluminescent displays.

In this application the term "3D" is used to refer to a stereoscopic or autostereoscopic image in which different images are presented to each eye resulting in the sensation of depth being created in the brain. This should be understood to be distinct from "3D graphics" in which a 3D object is rendered on a 2D dimensional display and each eye sees the exact same image.

One type of prior art switchable 2D/3D display system uses a switchable backlight unit in order to achieve switching between different directional distributions as described in Proc. SPIE vol.1915 Stereoscopic Displays and Applications IV(1993) pp 177-186, "Developments in Autostereoscopic Technology at Dimension Technologies Inc.", 1993. In a first mode, the light distribution from the backlight is substantially uniform and a 2D directional distribution from the display is generated. In a second display mode, light lines are produced by the backlight. These light lines are modulated by LCD pixels so that the windows of an autostereoscopic intensity distribution for viewing a 3D image are formed. The switching could, for example, be accomplished by means of a switchable diffuser element, controlled by a voltage applied across the diffuser. Such diffusers are well known in the prior art.

It is known that increasing the number of pixel columns under each parallax component, such as the lens of a lenticular screen or the slit of a parallax barrier, will increase the number of viewing windows available for the user, and thus will enable a 'look-around' effect, and increase lateral viewing freedom. Considering FIG. 3, windows 39,36,40,37,41, 38 may for example contain view data from views 1,2,3,4,5,6 respectively rather than repeating lobes of two views. Such an arrangement could be provided by 6 columns of pixels under each lens of a lens array.

One type of prior art pixel arrangement for autostereoscopic displays uses the well known stripe configuration as shown in FIG. 5 as used for standard 2D displays. This comprises columns of red pixels 1228, green pixels 1234 and blue pixels 1238. To generate an autostereoscopic display, a parallax element such as a lenticular array is aligned with pairs of colour sub-pixels as shown. Such a lens array 100 is shown in cross section while the pixels are shown in plan view for ease of explanation in the figures of this document. If a cylindrical lens array 100 is placed over the surface of this pixel configuration then each eye of the observer will see half of the horizontal pixels. This is illustrated in FIG. 5b for the right eye image comprising columns of red image pixels 102, blue image pixels 104 and image pixels green 106. In this case, the horizontal gap 108 between the pixels is substantially zero because the lenticular screen serves to distribute the light from the respective pixel across the whole of the aperture of the lens.

The use of colour pixels in a two view autostereoscopic display is shown in more detail in FIG. 6. The lens 1214 of the lens array 1208 serves to cover pixel columns 1228 and 1234. The column 1228 contains red right eye data and the column 1234 contains green left eye data. The pixels 1222 are imaged to the right eye by the lens 1214 and appear to fill the aperture of lens 1214. In the adjacent lens 1216, the blue pixel column 1238 is imaged to the right eye and the red pixel column 1230 is imaged to the left eye. Similarly for the lens 1218 the green pixel column 1236 is imaged to the right eye and the blue pixel column 1240 is imaged to the left eye.

In the 2D mode, a colour pixel 1200 is made from adjacent colour sub-pixels 1202, 1204 and 1206. However, the 3D image colour pixel is formed from pixels that have twice the spacing for example 1224, 1242 and 1207.

In this kind of two view spatially multiplexed autostereoscopic image, the horizontal pixel resolution of the stereoscopic image is half of the 2D horizontal pixel resolution.

The quality of the separation of images and the extent of the lateral and longitudinal viewing freedom of the display is determined by the window quality, as illustrated in FIG. 4. FIG. 4a shows the ideal viewing windows while FIG. 4b is a schematic of the actual viewing windows that may be outputted from the display. Several artefacts can occur due to inadequate window performance. Cross talk occurs when light from the right eye image is seen by the left eye and vice versa. This is a significant 3D image degradation mechanism which can lead to visual strain for the user. Additionally, poor window quality will lead to a reduction in the viewing freedom of the observer. One problem is the production of spatially derived artefacts as the viewer moves in front of the display. As the viewer moves past the windows, the variations in the total window intensity will be seen by the viewer as flicker of the image being displayed.

One type of spatial light modulator for use with autostereoscopic display is described in EP-A-0,625,861. The pixels are aligned in a manner so that the columns of the pixels are substantially contiguous so as to provide uniform viewing windows when combined with a parallax element. Such a display disadvantageously suffers from limited aperture ratio because the individual columns of contiguous pixels are separated within a row.

EP-A-0,833,184 discloses another type of spatial light modulator in which the viewing windows have substantially uniform intensity when combined with a parallax element with power by means of the vertical gap between pixels being inclined so that the pixel apertures overlap along the rows and the pixel apertures being shaped so that total height of the pixels at each point along the rows of pixels is a constant.

However, in the case of an autostereoscopic display apparatus, it is necessary for some adjacent columns to show different images to be viewed by the two eyes of the viewer. A sharp transition between the windows showing different images is desirable to prevent cross-talk between the two images at the edges of the window. To achieve this it is desirable for the gaps between the columns of pixels to extend parallel to the columns of pixels, that is vertically. Minimising the width of such gaps is difficult to achieve, because such gaps are necessary for the routing of the electrical connections to the pixels. A narrow gap presents manufacturing difficulties. For example, small gaps are susceptible to errors in the colour filter manufacturing process causing the position of the gaps to vary, and colour filters to overlap or underlap. Also, the nature of the spatial light modulator may present a theoretical limit. For example, in the case of an LCD spatial light modulator the gaps cannot be substantially less than the thickness of the LCD cells to allow independent operation of adjacent pixels. Thus in practice the gaps must have a finite width and some spatially derived artefacts remain in a directional display apparatus.

The present invention relates to an autostereoscopic display apparatus comprising:

a spatial light modulator comprising an array of pixels arranged in rows and columns in a pixel plane, the pixels comprising pixel apertures having gaps therebetween with the gaps between the columns of pixels extending substantially parallel to the columns of pixels; and a spatially multiplexing parallax element capable of directing light from successive columns of pixels towards successive ones of two or more viewing windows in a nominal window plane.

In such an autostereoscopic display apparatus, it would be desirable to reduce spatially derived artefacts of the type described above.

According to a first aspect of the present invention, the pixel apertures are arranged so that the convolution across two adjacent columns in a direction perpendicular to the columns of:

(a) the intensity profile of an image of a nominal human pupil in the nominal window plane formed in the pixel plane by the spatially multiplexing parallax element and (b) the total height of the pixel apertures parallel to the columns of pixels varies by at most 5% of the maximum of the convolution.

According to a second aspect of the present invention, the pixel apertures repeat at a pitch equal to a representative width of said intensity profile.

According to a third aspect of the present invention, the total height of the pixel apertures parallel to the columns of pixels varies.

Thus in all the aspects of the present invention the arrangement of the pixels may be designed taking account of the image of a nominal human pupil in the nominal window plane formed in the pixel plane by the spatially multiplexing parallax element to reduce the amount of spatially derived artefact. In particular, the amount of flicker observed by a viewer moving across the window plane may be reduced or even eliminated. Thus the performance of the viewing windows may be optimised. This allows the viewing freedom of an autostereoscopic display apparatus to be increased.

As the gaps between columns extend parallel to the columns, the advantages mentioned above may be achieved without adverse effect on the cross talk of the images in adjacent windows or aperture ratio of the display.

The spatially multiplexing parallax element is preferably a lenticular array, but in general may be any suitable parallax element such as a parallax barrier or a holographic optical element. It may be a polarisation sensitive element in combination with a suitably polarised illumination source.

The present invention is particularly applicable to a multiple window imaging system, being a system having more than two viewing windows, typically three or four viewing windows in present systems. Such multiple window imaging systems can advantageously provide an improved viewing freedom in an autostereoscopic display. This can be by means of viewing windows each presenting different views, such that as an observer moves with respect to the display, the image seen varies. Alternatively, a tracking system may be used to measure the position of an observer, and to update the data displayed in each of the windows in accordance with the observer's position. If more than two windows are used, then the data can be adjusted in the windows not currently being seen by the observer. Thus, the update of the image data is not seen, and so substantially no apparent flicker of the image will be seen.

Such multiple viewing window systems rely on minimizing the intensity variation at the boundary between the viewing windows. Otherwise when the user moves between windows, the intensity varies which is perceived as flickering of the image. This is achieved by the present invention which allows the intensity variation to be minimized while allowing a reduced size of optical spot to be used in the system. This allows the cross talk between adjacent windows to be minimized and thus the image quality to be improved.

Whilst the pitch of the windows at the nominal viewing distance may be equal to a nominal interocular separation of an observer, as known for multiple window imaging systems, the invention may be applied with advantage to a multiple window imaging system in which the pitch of the windows at the nominal viewing. distance is less than the nominal interocular separation of an observer which may be taken as 65 mm, or less than a typical minimum interocular separation of an observer which may be taken as 55 mm. For example the pitch of the windows can be ⅔ or ½ the nominal interocular separation, or even less. Such decrease in the size of the windows allows the thickness of the display substrate to be increased for a given nominal viewing distance and hence facilitates manufacture. Conversely, as there are practical difficulties in reducing the thickness of the display substrate, a reduction in the window pitch allows a shorter viewing distance to be achieved. The reason is that the nominal viewing distance from the display, at the window plane, is determined by the pixel pitch and the glass thickness. For small pixels, for example 50 μm pitch, a total separation of the lens from pixel plane of 0.47 mm is required to achieve a 65 mm window at a 400 mm viewing distance, assuming a glass refractive index of 1.52. Display substrate thicknesses are commonly 0.5 mm, so that combined with the lens structure, short viewing distances are difficult to achieve. However, as an example of arranging more than two viewing windows of size less than 55 mm to be imaged to the window plane, one might image four windows of size 32.5 mm to be imaged. The separation of pixel plane to lens is then 0.94 mm in the example given. Such a thickness is more easily obtained in the display.

According to a fifth aspect of the present invention, there is provided an autostereoscopic display apparatus comprising:

a spatial light modulator comprising an array of pixels arranged in columns and rows, where vertical gaps are positioned between the pixel columns; and a parallax element arranged to provide a vertically extended image of an observer's pupil at a plane of the spatial light modulator, wherein the shape of the pixel apertures is determined by the horizontal convolution of the nominal profile of the illumination spot at the pixel plane such that the integrated intensity at the window plane is constant across at least a first window boundary in the window plane.

Alternatively, the shape of at least one of the pixel sub-apertures may be nominally the shape of the intensity profile of the vertically extended illumination spot, such that the integrated intensity at the window plane is constant across at least a first window boundary in the window plane.

The spot size and shape of the parallax element optic may be fixed in manufacture to match the panel structure.

Different features of the first aspect of the invention may tend to provide the following advantages singly or in any combination.

Embodiments of the present invention will now be described, by way of example only, with reference to the accompanying drawings, in which:

FIG. 6 shows the arrangement of data on a two view lenticular display of the type shown in FIG. 7a;

FIG. 11a shows the illumination of a standard RGB stripe panel by a cylindrical lens;

FIG. 11b shows the effect of a standard RGB stripe configuration on intensity variation in the window plane;

FIG. 12a shows the illumination of a panel comprising pixels with sub-regions;

FIG. 12b shows the effect of the structure of FIG. 12a on intensity variation in the window plane;

FIG. 13 shows an example configuration of the sub-pixel regions with half area green pixels;

FIG. 24 shows an arrangement of eye spots with respect to the display;

FIG. 25 shows the arrangement of viewing windows in the display;

FIG. 26 shows the extent of the lateral viewing freedom of the display in first and second directions;

First there will be described several different display apparatuses to which the pixel arrangement of the present invention may be applied. The pixel arrangement of the present invention may be applied to the display apparatuses described in WO-03/015,424, which is incorporated herein by reference. Some of those types of display apparatus will now be summarised, but further features of the display apparatuses are described in WO-03/015,424 and may be incorporated in display apparatuses in accordance with the present invention.

Figure 7:
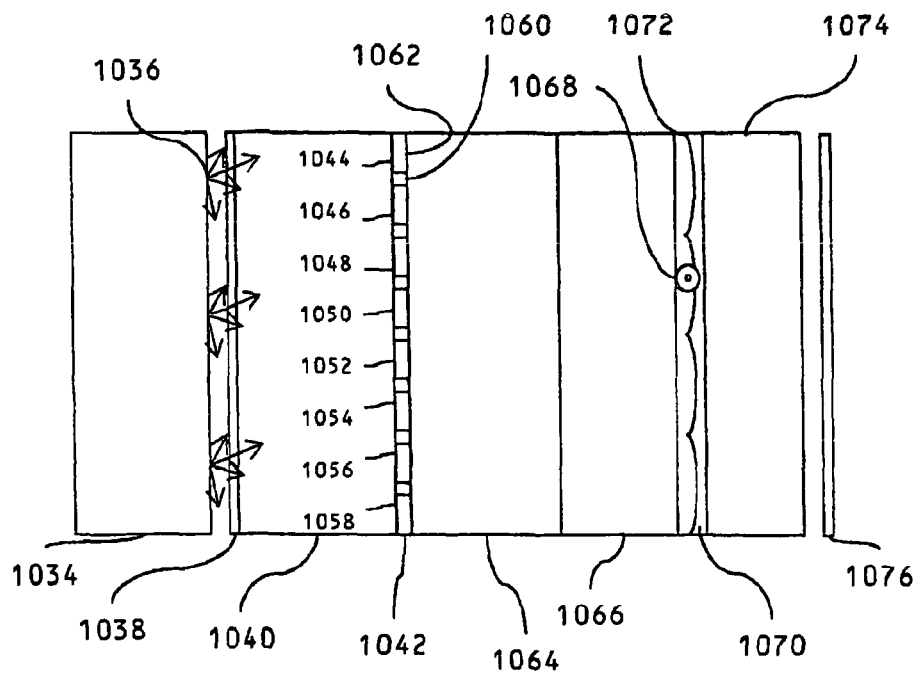
FIG. 7 shows a switchable 2D/3D system.

A type of 2D/3D switchable directional display device which is particularly suited for implementing the present invention will first be described with reference to FIG. 7 which shows one type of switchable directional display as described in WO-03/015,424.

A backlight 1034 produces an optical output 1036 which is incident on an input linear polariser 1038, and a LCD TFT substrate 1040. The light passes through the pixel plane 1042 comprising an array of LCD pixels 1044-1058. Each pixel comprises a separate region of addressable liquid crystal material, a colour filter and is surrounded by a black mask 1060 to form a pixel aperture 1062. The light then passes through the LCD counter substrate 1064 and through a carrier substrate 1066 to fall on a birefringent microlens 1072 comprising a layer of birefringent material 1068 and an isotropic lens microstructure 1070. The light then passes through a lens substrate 1074 and a polarisation modifying device 1076.

Figure 8:
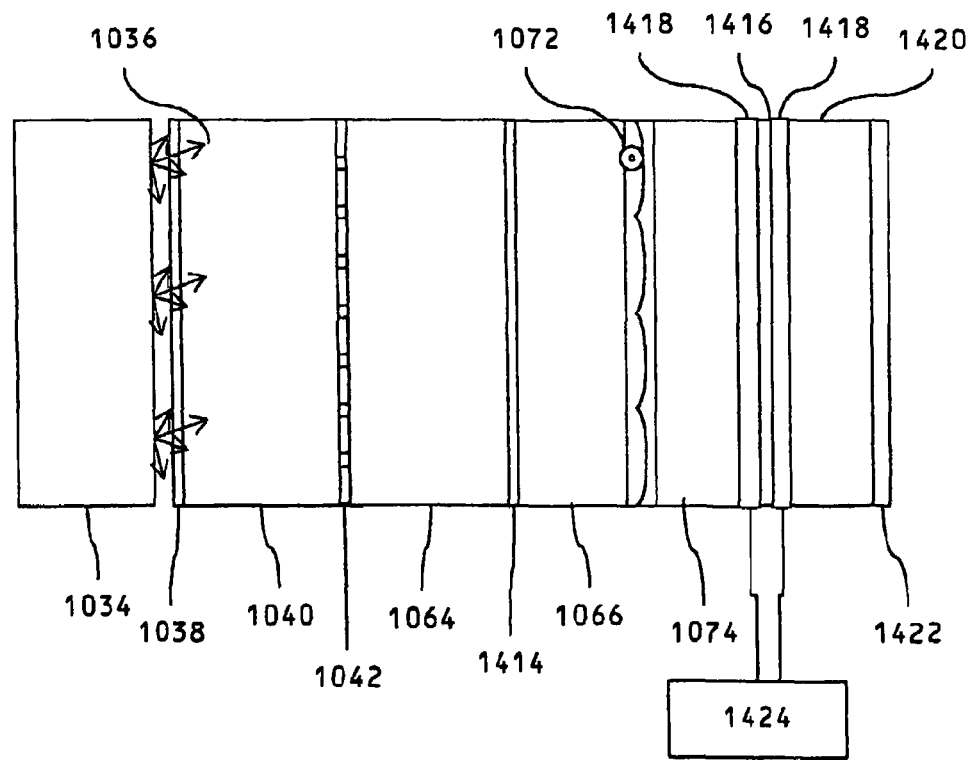
FIG. 8 shows a 3D autostereoscopic display in which the directional distribution is switched by means of an electronically controlled polarisation switching element.

FIG. 8 shows a further type of switchable directional display described in WO-03/015,424 in which the directional distribution is switched by means of a switchable polariser element. A backlight 1034 produces an optical output 1036 which is incident on an input linear polariser 1038, and a LCD TFT substrate 1040. The light passes through the pixel plane 1042 comprising an array of LCD pixels. The light then passes through the LCD counter substrate 1064, an LCD output polariser 1414 and through a carrier substrate 1066 to fall on a birefringent microlens 1072 comprising a layer of birefringent material and an isotropic lens microstructure. The light then passes through a lens substrate 1074 and a polarisation modifying device 1416.

The polarisation modifying device 1416 may be embodied as for example a twisted nematic liquid crystal layer sandwiched between surfaces treated with transparent electrodes and liquid crystal alignment layers 1418 as well known in the art. A sensing device 1424 may be used to monitor the electrical driving of the polarisation switching layer 1416. The second substrate 1420 of the cell 1416, 1418 has a polariser 1422 attached to its second surface.

The polariser 1414 may be a linear polariser with a transmission direction aligned at 45 degrees to the birefringent optical axis of the microlens 1072. The birefringent axis of the microlens is the direction of the extraordinary axis of the birefringent material used in the birefringent microlens 1072. The polarisation state incident on to the birefringent microlens will resolve on to the two axes of the birefringent material. In a first axis, the refractive index of the birefringent material is substantially index matched to the isotropic index of the birefringent microlens 1072 and so the lens has substantially no imaging function. In a second axis, which may be orthogonal to the first axis, the refractive index of the birefringent material has a different refractive index to the isotropic material and thus the lens has an imaging function.

In a 2D mode of operation, no voltage is applied across the liquid crystal layer 1416, and an incident polarisation state is rotated. In a 3D mode of operation, a voltage is applied across the cell, and the incident polarisation state is substantially unrotated.

If the switch 1416 is set so that the polarisation state transmitted through the polariser 1422 is parallel to the first axis, then the display will have a 2D directional distribution. If the switch 1416 is set so that the polarisation state transmitted through the polariser 1422 is parallel to the second axis, then the display will have an autostereoscopic 3D directional distribution. The sensing device 1424 thus determines the display mode of the optical switching apparatus by determining the electrical driving of the polarising element.

Figure 1A:
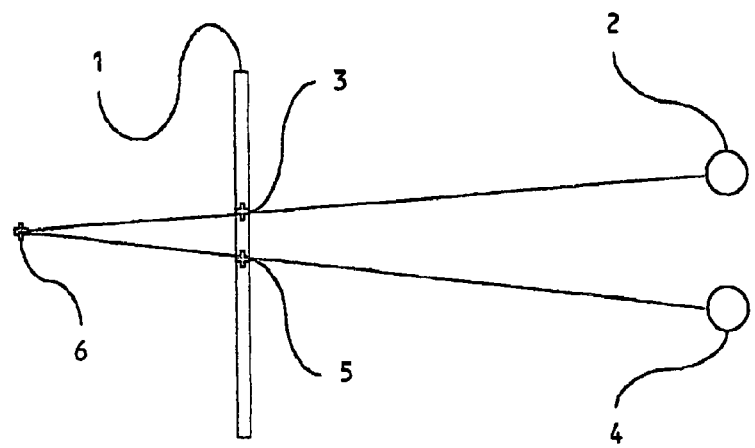
FIG. 1a shows the generation of apparent depth in a 3D display for an object behind the screen plane.
Figure 1B:
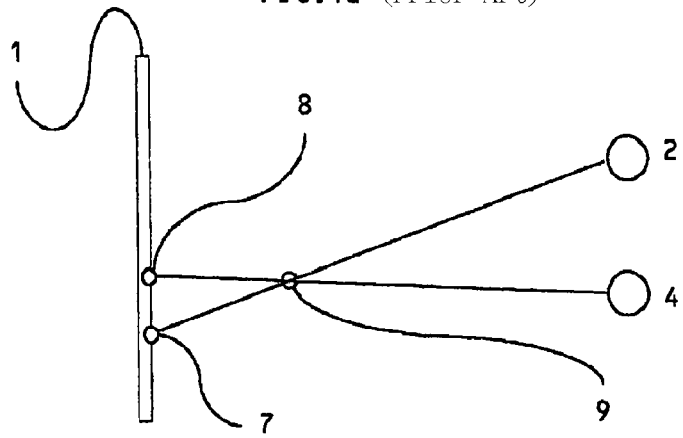
FIG. 1b shows the generation of apparent depth in a 3D display for an object in front of the screen plane.
Figure 1C:
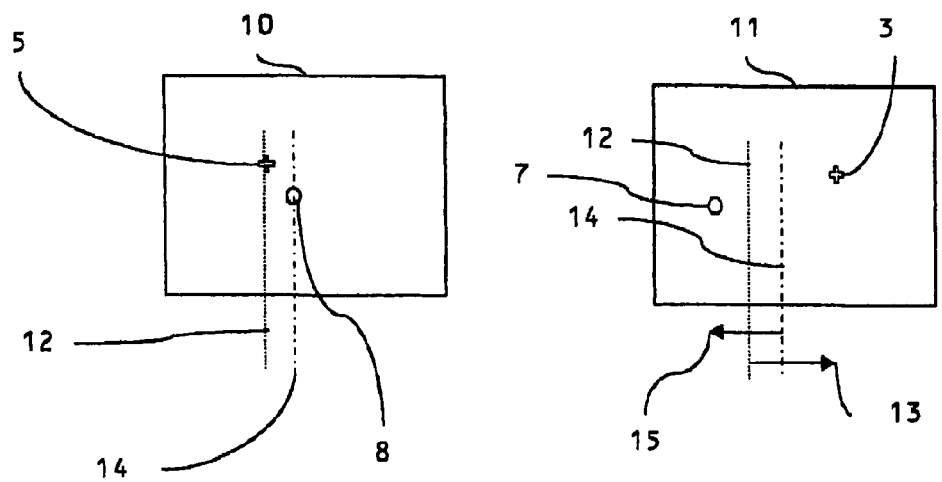
FIG. 1c shows the position of the corresponding homologous points on each image of a stereo pair of images.
Figure 2A:
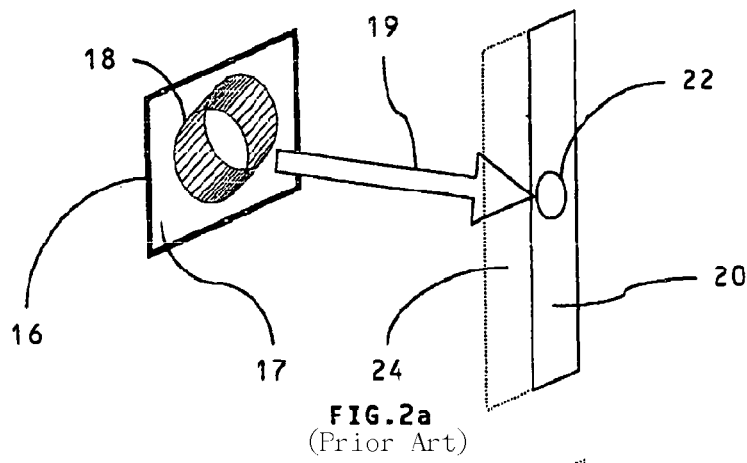
FIG. 2a shows schematically the formation of the right eye viewing window in front of an autostereoscopic 3D display.
Figure 2B:
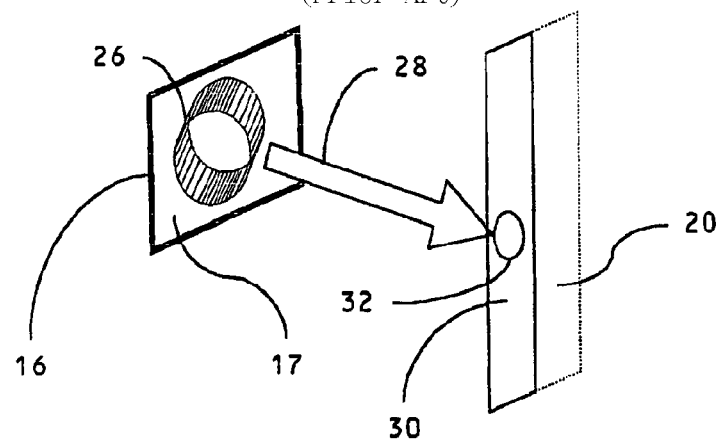
FIG. 2b shows schematically the formation of the left eye viewing window in front of an autostereoscopic 3D display.
Figure 3:
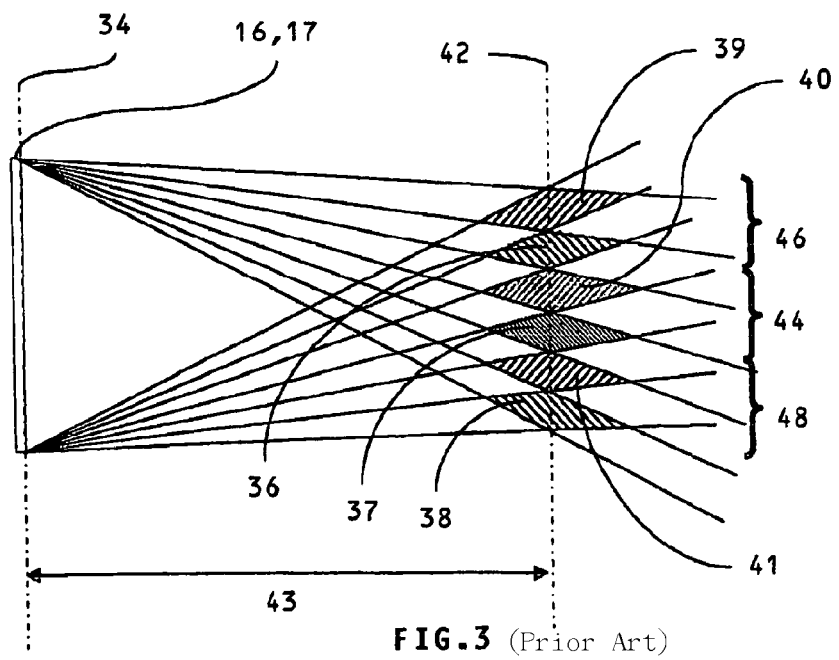
FIG. 3 shows in plan view the generation of viewing zones from the output cones of a 3D display.
Figure 4A:
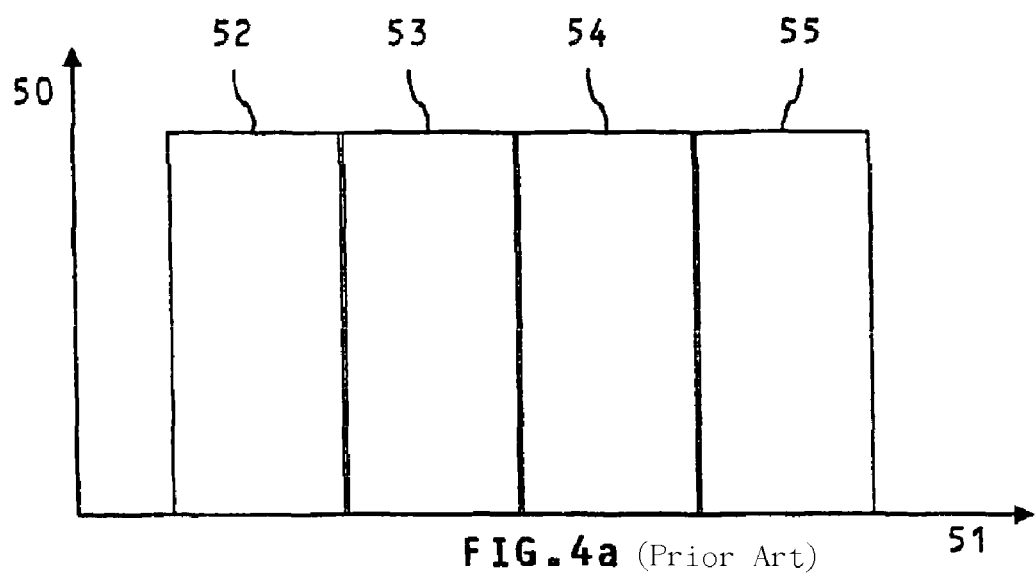
FIG. 4a shows the ideal window profile for an autostereoscopic display.
Figure 4B:
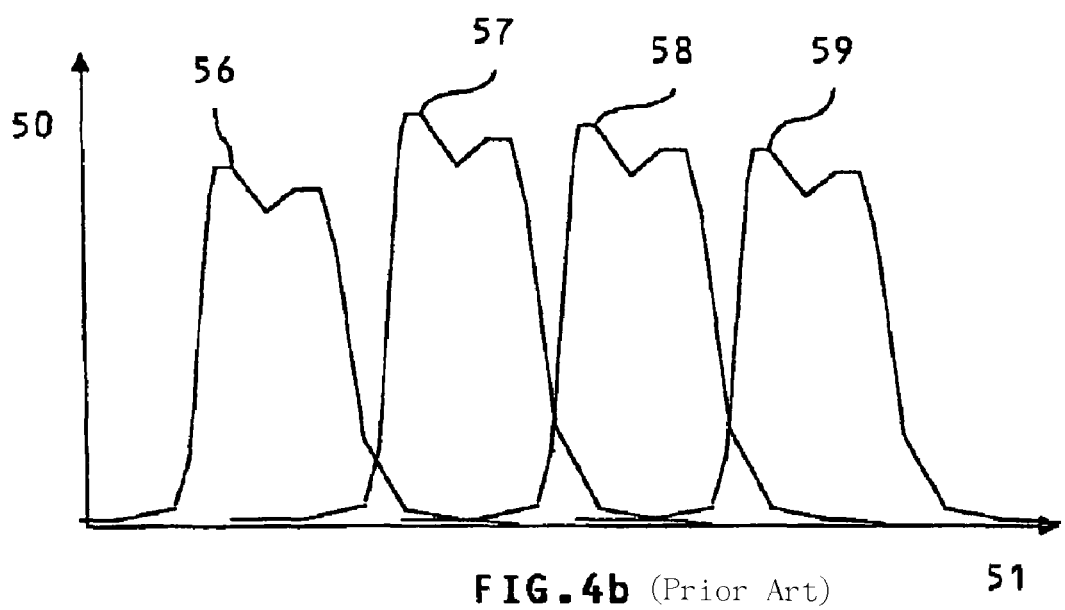
FIG. 4b shows a schematic of the output profile of viewing windows from an autostereoscopic 3D display.
Figure 5A:
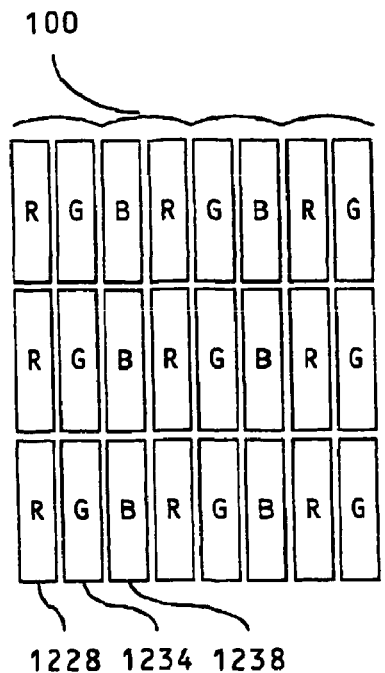
FIG. 5a shows a prior art colour filter pattern.
Figure 5B:
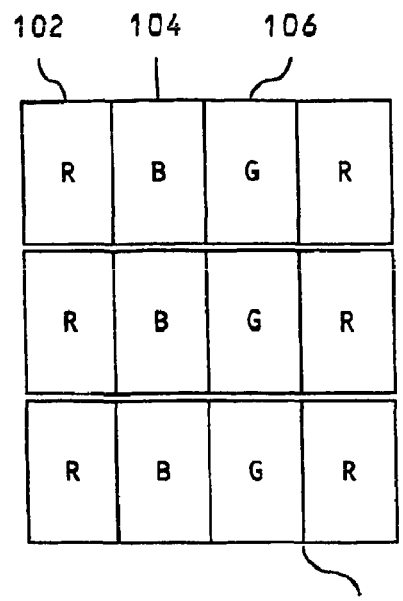
FIG. 5b shows the appearance of FIG. 7a when used in conjunction with a two view parallax optic in the right eye of an observer.
Figure 6:
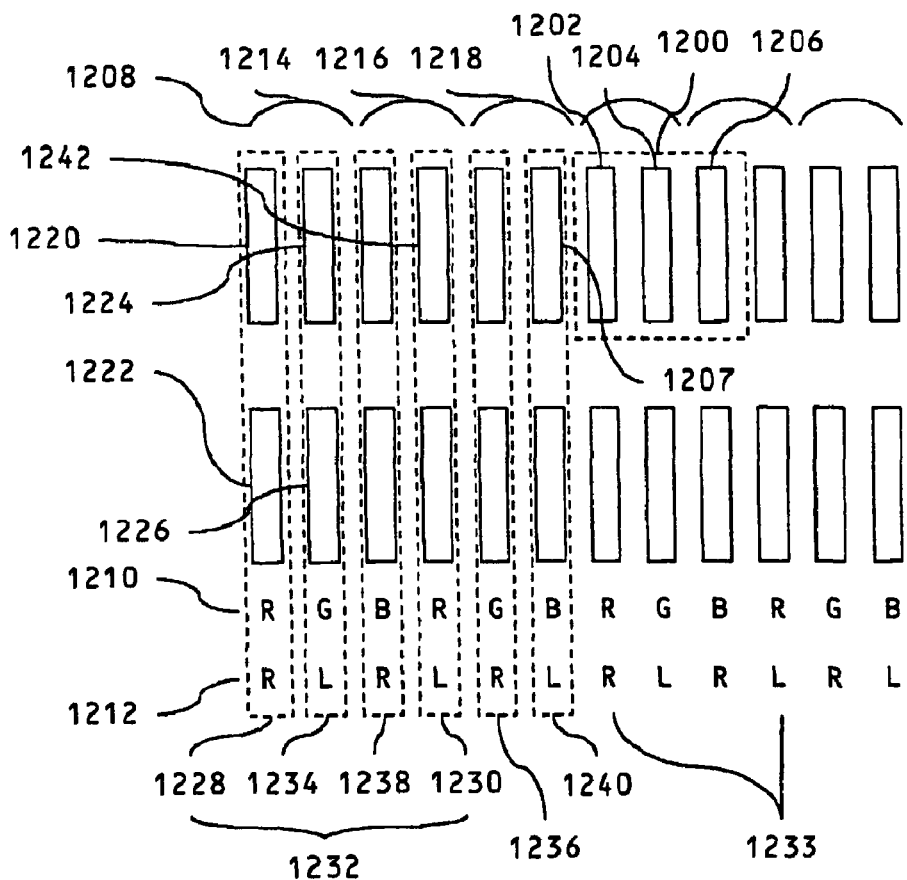
Figure 9:
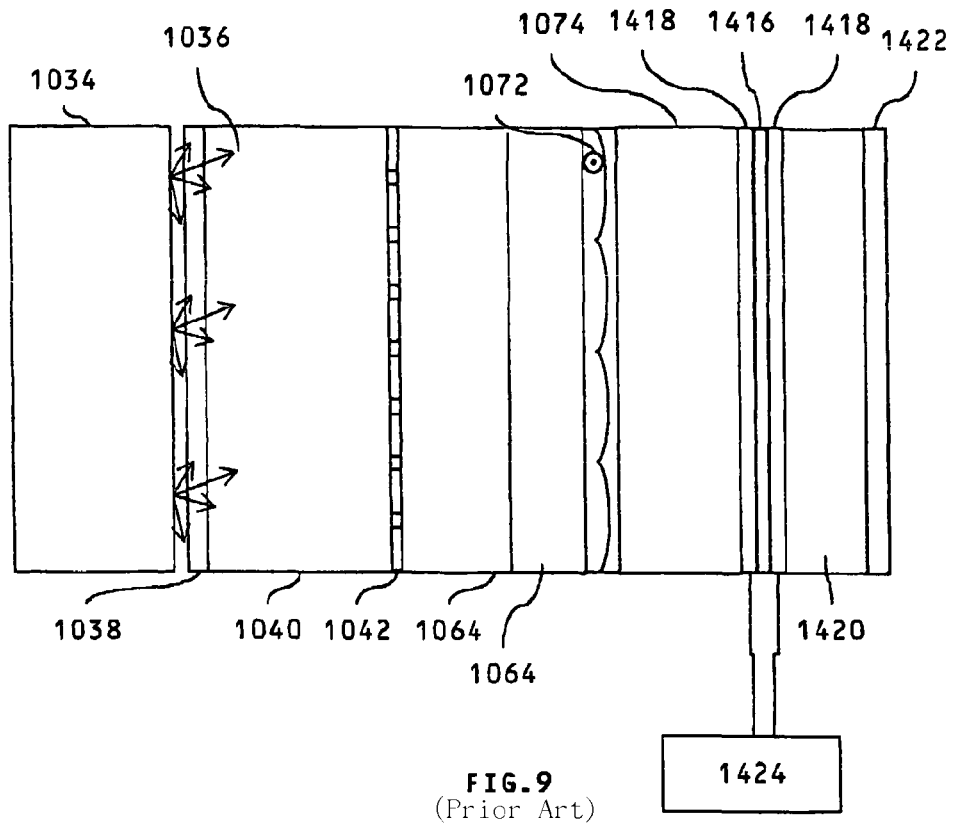
FIG. 9 shows a further 3D autostereoscopic display in which the directional distribution is switched by means of an electronically controlled polarisation switching element between a lens array and an output polariser.

FIG. 9 shows a further type of switchable directional display described in WO-03/015,424 in which the directional distribution is switched by means of a switchable polariser element. This is similar in structure to the architecture of FIG. 4 except that the polariser 1414 is omitted and the orientation of polarisation angles is different. Such a device operates is a similar way to the device of FIG. 3 except that the mechanically reconfigurable polariser is replaced by an electrically switched polariser 1416 which may be for example a twisted nematic liquid crystal layer sandwiched between surfaces 1418 comprising transparent electrodes and alignment layers and an absorbing linear polariser 1422.

As described for FIG. 8, the device may be switched between 2D and 3D directional distributions by selecting the polarisation state that is transmitted by the final polariser 1422.

Figure 10:
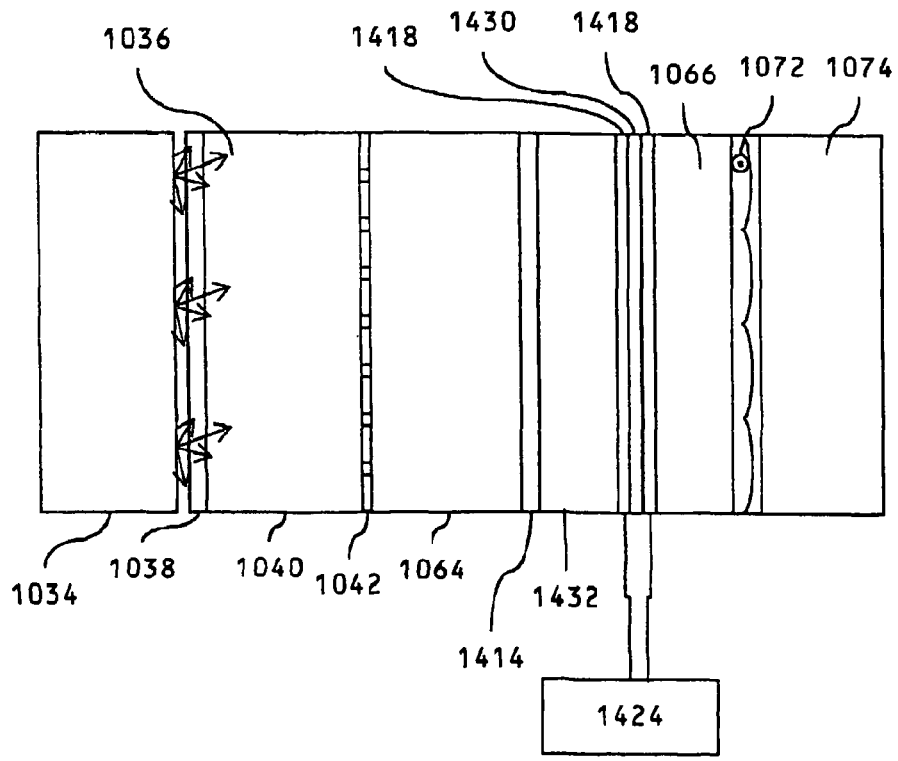
FIG. 10 shows a further 3D autostereoscopic display in which the directional distribution is switched by means of an electronically controlled polarisation switching element between an output polariser and a lens array.

FIG. 10 shows a further type of switchable directional display described in WO-03/015,424 in which the directional distribution is switched by means of a switchable polariser element positioned between a display output polariser and a birefringent microlens array 1072. The output linear polarisation of the display transmitted by polariser 1414 is transmitted though a switch substrate 1432, transparent electrodes and alignment layers 1418 sandwiching a twisted nematic layer 1430, a lens counter substrate 1066, a birefringent microlens 1072 and a lens substrate 1074.

In the 2D mode, the polarisation switch 1430 rotates the incident polarisation so that it is incident on to the ordinary axis of the material in the birefringent microlens. The ordinary index is matched to the index of the isotropic material and thus the lens has no effect. In the 3D mode, an electric field is applied to the liquid crystal layer 1430 so that the polarisation state is not rotated and the light is incident on the extraordinary axis of the birefringent microlens. The lens then has an optical effect which produces the autostereoscopic directional distribution.

The sensing device 1424 thus determines the display mode of the optical switching apparatus by determining the electrical driving of the polarising element.

Pixel arrangements in accordance with the present invention will now be described. Any of the following pixel arrangements may be applied to the arrangement of the pixels in the spatial light modulator in any of the types of display apparatus described above. In general, the present invention may be applied to other types of spatial light modulator too.

In the pixel arrangements described below the pixels are arranged in arrays of rows and columns extending perpendicular to one another. The terms vertical and horizontal will be used to define the directions along the columns and rows, respectively, but these terms should not be understood to limit the orientation of the display which may vary in use. The pixels comprise pixel apertures and gaps therebetween. In the pixel arrangements, the gaps between the columns extend substantially vertically, preferably exactly vertically, although in practice some variation could be allowed provided that the adjacent pixels do not overlap.

It is desirable that the intensity variation that occurs in the window plane as the observer moves is minimized, so as to avoid the display from appearing to flicker as the observer passes across a window boundary. For example, the final intensity profile of FIG. 4*a* in which there is substantially no gap between the windows is required rather than the intensity profile of FIG. 4*b*. The intensity fluctuation in the window plane in a lenticular screen or parallax barrier display is determined by the shape of the pixel, the optical characteristics of the lens or slit and the shape and size of the observer's pupil. As described in more detail below, it is possible to provide a window structure closer to that shown in FIG. 4*a* by providing appropriate pixel shapes and illumination of the spot at the pixel plane.

One method to reduce the visibility of the window boundaries is to use windows of size less than the nominal interocular separation of the observer. Thus, as one eye crosses a boundary, the other eye will be in a uniform area of the window, and the flicker artefact will only be in one eye, reducing the overall visibility.

FIG. 11*a* shows a prior art display in which a spot 500 which is the image of an observer's pupil in the nominal window plane when imaged through one lens 501 of a lenticular screen onto the pixel plane 502. The image 500 comprises a lateral intensity profile extending vertically generated by the lens element of a lenticular screen (comprising an array of vertically extending cylindrical lenses). The relative position of the peak intensity of the spot 500 is shown by the line 503. Generally the line 503 is parallel to the vertical columns of the pixels. In general, the shape and size of the spot 500 can be set by controlling the optical performance of the lens 501. The surface shape, lens materials and separation of the lens from the pixel plane may be adjusted to optimise the spot shape.

The pixel arrangements below are designed taking the shape of the spot 500 into account. In practice this is straightforward to do and use of such a nominal pupil is routine in the field of optics. Typically the size of a human pupil shows little variation so any typical pupil size may be taken. For any given display apparatus there will be a nominal window plane, although in practice the depth of field will be sufficiently large that the precise distance of the nominal window plane from the display will not significantly change the design of the display apparatus.

Generally, the diameter of the human pupil varies in a range between approximately 4-7 mm. The size of the pupil will be determined by the display brightness and ambient lighting conditions, but will generally be of the order of 5 mm diameter for a display of brightness 200 cd/m2. Such a pupil size may be considered appropriate for a nominal pupil size.

For a typical window size of 65 mm and a 60 µm pixel pitch, the 5 mm pupil diameter represents a size of +/−2.3 µm at a pixel plane. This is a small proportion of the total spot size which may for example be 20 µm width (5-95%). As the pupil is round, but imaged to a line by the lenticular screen, then the energy is most tightly distributed in a region of less than +/−1

μm. Thus, to a first order variations in the diameter of the pupil has a relatively small effect on the size of the illumination spot at the pixel plane as the width of the spot is dominated by the performance of the lens for a source substantially at infinity.

The pixel plane comprises an array of red pixel apertures 504, green pixel apertures 506, and blue 508 pixel apertures, surrounded by pixel gaps, for example black mask 510. The pitch of the lenticular screen 501 may be more than two colour sub-pixels, for example substantially the pitch of four pixels. The pixels may also be arranged in rows of a single colour such that the panel comprises for example repeating rows of red, green and blue pixels respectively. Such a panel may be for example a portrait panel (in which each of the columns comprise pixels of the same colour) for use in the 2D mode in portrait orientation. The panel may also be used in 2D mode for the landscape orientation. However, the lens orientation is fixed at the time of manufacture, so such a panel may be used in the landscape orientation for the 3D mode. In this case, the panel would appear to comprise rows of the same colour pixels with respect to the geometric lens axis.

As the observer moves laterally, the spot 500 traverses the display surface in a direction shown by the arrow 512 so that the image seen by the observer moves across the respective pixel apertures. The optical quality of the autostereoscopic 3D image is determined by the quality of the spot 500 at the pixel plane. If the spot is sufficiently large, then the eye will see data from adjacent pixels and cross talk will be seen in the image.

For a moving observer moving across an array of ON pixels, the intensity variation shown in FIG. 11b will be seen in which the display intensity 514 is plotted against lateral position in the window plane 516, as determined by the convolution of the spot 500 with the pixel profile. In the regions 518 where the spot is in the centre of the pixel columns then the display brightness is maximised, whereas in the regions 520 where the spot falls over the gap between the pixels then the brightness is minimised. The observer sees the intensity variation 522 as a flicker of the display as they move, and it is the purpose of this invention to minimise the variation.

One means to minimise the intensity variation is to increase the size of the spot so that it covers several pixels. However, this serves to allow the observer to see light from adjacent pixels, and thus the display cross-talk will increase which is undesirable.

In this invention, a small spot size is maintained in order to minimise cross talk, while optimising window uniformity.

A first embodiment of the invention is shown in FIG. 12a. Each colour pixel 532 is divided into three apertures 526, 528 and 530, each separated by a vertically extending gap 534. Each apertures 526, 528 and 530 has the same, constant vertical height and the same width. The apertures 526, 528 and 530 of each pixel 532 are commonly addressable.

To a first approximation, the spot 524 at the pixel plane may be taken to be a top-hat function having a width which is representative of the actual spot. For example the width may be taken to be the width between the 5% and 95% cumulative integration points of the intensity profile of the actual spot. In the embodiment of FIG. 12a, the pitch, namely the sum of the width of the aperture 526 and the width of the gap 534, is designed to be substantially the same as the width of the spot 524. As a result, the spot 524 always covers the same proportion of the pixel aperture 526 and pixel gap 534, so the integrated intensity of the output will be the same, irrespective of spot position, as shown in FIG. 12b. In other words, the convolution of the spot 524 with the height of the pixel apertures, which is the intensity seen by the eye at any given position, remains constant.

In one example, a TFT-LCD display with colour sub-pixel pitch of 60 μm is used with a horizontal gap of 15 μm. To avoid cross talk, and maximise viewing freedom, a spot width of 20 μm diameter (5-95% energy) is selected by the design and construction of the lens. The pixel 532 is then divided into three equal apertures 526, 528 and 530 of width 15 μm, separated by gaps 534 of 5 μm width. Each of the three apertures is addressed by the same data signal, and comprises a uniformly switched liquid crystal cell, and the same colour filter. The sub-gaps may be defined by the black mask layer, which may be formed on the counter substrate of the display device.

FIG. 13 shows another embodiment of the invention using the pixels configuration incorporating an additional magenta pixel and half size green pixels as described in a co-pending application filed on the same day as this application ( PCT/GB04/002987, published as WO-2005/006775). The red and blue colour components are formed in a first row 540, and the green components are formed in a second row 542. The pixels are divided in to column groups 532 comprising red and green, blue and green or magenta and green column data. The use of the additional row of green pixels means that the pixel width can be increased for the same lateral 3D luminance pitch. This advantageously allows a larger separation between the pixel plane and the lenses, and gives more flexibility for spot design. Advantageously, the larger pixel pitch means that the gap width 543 may be smaller as a proportion of the total pixel width due to the finite size of electrodes required to address the panel pixels. In this example, the pixels are shown as having a single gap per pixel.

In TFT-LCDs, the gaps between the pixels are determined by the width of the source electrodes, and size of addressing electronics such as thin film transistors and storage capacitors. In this invention, it is desirable (but not necessary) that the sub-gaps do not substantially reduce the aperture ratio of the panel further than that required by the addressing electronics. It may be possible to split the source electrode into two equal width electrodes. However, this may increase the resistance of the panel electrodes, which may be undesirable. Alternatively, it may be possible to incorporate the storage capacitor along the additional gaps while maintaining the width of the source electrodes. In this way, the vertical aperture ratio of the display may be increased, thus retaining display aperture ratio.

In practice, the optical spot will not be an ideal top-hat function so that small residual intensity fluctuations may exist between the windows in the window plane. The sources of degradation of the top-hat will be due to diffraction in the lens aperture, scatter from optical surfaces, the image of the observer's round pupil and chromatic aberration. To remove diffraction effects, it may be possible to apodize the diffractive lens aperture, by means of incorporating additional diffractive components. Diffractive components may be incorporated in to the refractive structure of the lens.

Transverse chromatic aberrations arise from dispersion effects in the lens materials, and may be compensated by suitable choice of materials used to fabricate the lens structure, particularly in the case of birefringent lenses formed against an isotropic medium. Further diffractive correction of chromatic aberrations may be incorporated, for example in to the refractive lens surface.

The spot produced by the lens can be optimised during manufacture, for example by using a UV curable lens with a refractive index which varies dependent on cure temperature. UV curable birefringent materials are known in the art. If the lens is appropriately positioned with respect to the pixel aperture, or a test pixel aperture so that the intensity fluctuations in the far field can be measured, then the optimum cure temperature can be established to minimise the intensity fluctuations in the window plane.

In the above described pixel arrangements each pixel has a constant vertical height across its horizontal width and the pitch of the pixels is designed taking into account the width of the spot. In the following pixel arrangements, the height of the pixel apertures is designed taking into account the shape of the spot.

Figure 14:
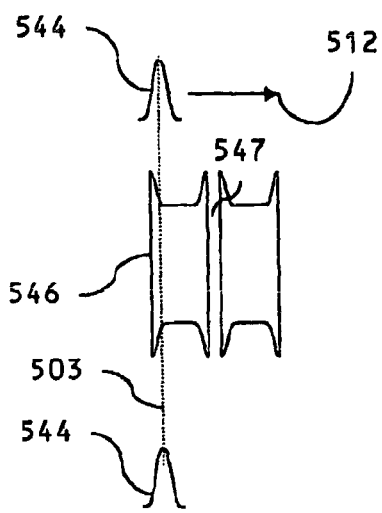
FIG. 14 shows the illumination of pixels to compensate for gap regions.

FIG. 14 shows a spot 544 falling on a pixel plane, with translation 512 of the spot across the pixel plane for a moving observer in the window plane. Pixel apertures 546 of the invention, separated by gaps 547 are shown. As shown in detail in FIG. 15, the pixel aperture is divided in to substantially rectangular aperture regions 548 and further aperture regions 550. Gap regions 551 and 549 are also marked. The purpose of the aperture regions 550 is to provide additional luminance in the window plane when the spot is in the region of the gap 551. Thus the overall profile of the vertical height of the pixel aperture 546 is flat in a central portion and increases towards the edges.

For a single parallax device, the vertical extent of the aperture regions 550 is set so that the integrated intensity under the spot 544 when spot position 503 is at the centre of the gap is the same as the vertical integrated intensity for the spot position 503 when in the centre of the pixel. In other words, the horizontal convolution of the spot 544 with the vertical height of the pixel aperture 546, which represents the intensity seen by the observer's eye, is constant at all horizontal positions. Thus, in the aperture regions 550, extra vertically extended pixel area is allocated compared to the centre of the pixel.

As the spot moves away from the centre of the gap, the additional intensity required falls, with the profile of the falling intensity substantially the same as the profile of the spot convolved with a square spot. Thus the regions have substantially the same profile as the optical spot 544 at the pixel plane. In this way, the appearance of the gaps can be eliminated. Advantageously, the gap region 551 does not need to be adjusted to compensate.

Figure 15:
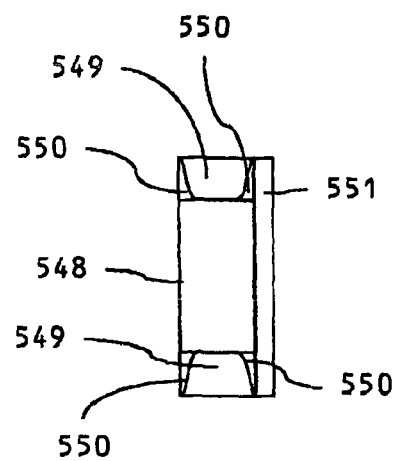
FIG. 15 shows the structure of the pixels of FIG. 14.
Figure 16:
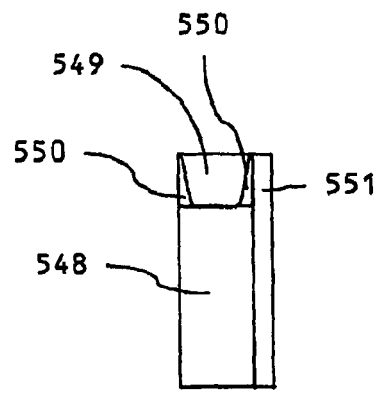
FIG. 16 shows the an alternative pixel structure of the invention.

FIG. 16 shows an alternative embodiment of the invention in which a single gap region 549 is used per pixel, with two aperture regions 550. The total integrated intensity of the regions 550 is the same as for FIG. 15, so that the sub-apertures are larger in extent in this embodiment.

Figure 17:
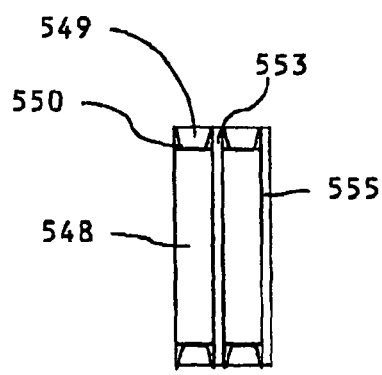
FIG. 17 shows the use of further sub-apertures to enhance the performance in the window plane.

The vertical extent of the aperture regions 550 may limit the vertical aperture ratio of the panel. The limit on vertical extent may be reduced by using further gap regions as shown in FIG. 17. In this case, the gap 551 of FIG. 15 is replaced by two gaps 553 and 555 of the pixel so that the intensity variation produced by the gap 551 is reduced. This results in a smaller area of the aperture 550, and a larger aperture 548. The vertical aperture ratio is thus increased. The use of additional gaps will result in further uniformity of the window boundary, particularly if the aperture and gap width is substantially equal to the spot width.

Figure 18:
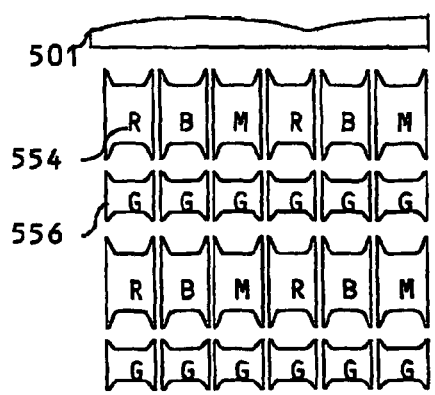
FIG. 18 shows an example configuration of the sub-aperture regions with half area green pixels.
Figure 19:
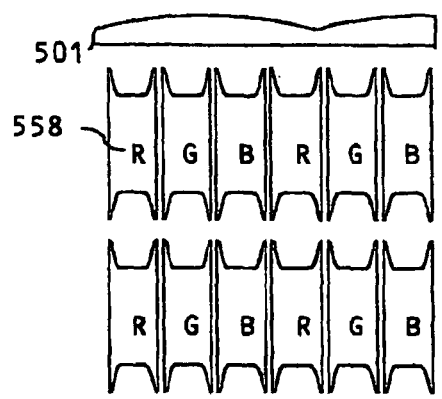
FIG. 19 shows an example configuration of the sub-aperture regions with RGB stripe pixel pattern.

The pixels may be arranged for example in RBMGGG configurations as shown in FIG. 18 in which rows 554 of red, blue and magenta pixels are interleaved with rows 556 of green pixels. Alternatively, the pixels may be arranged in other configurations such as the rows 558 of RGB stripe pixels as shown in FIG. 19.

Figure 20:
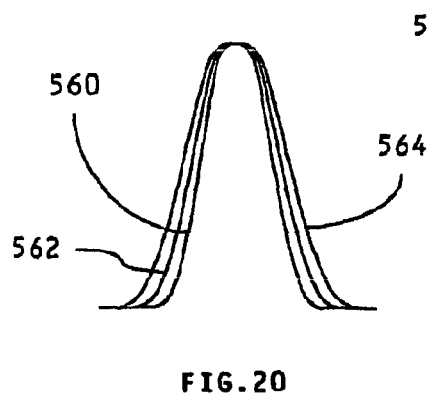
FIG. 20 shows the appearance of illumination spots with chromatic aberration.
Figure 21:
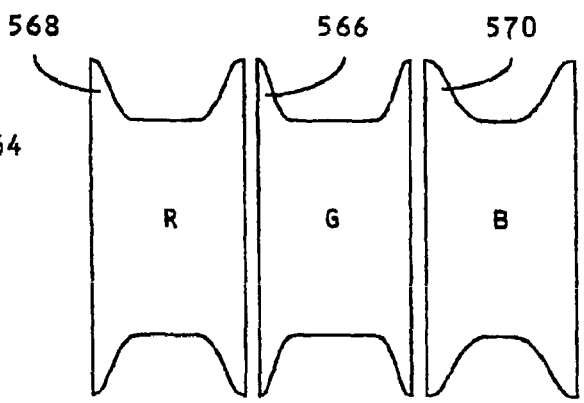
FIG. 21 shows the adjustment of pixel lobes in order to compensate for chromatic aberration.

In practice, the spot shape may include chromatic aberration effects, in which the size of the red spots 562, green spots 560 and blue spots 564 are different, as shown in FIG. 20. In this case, the convolution of the spot with the pixel boundary may be different for each coloured spot. The pixel apertures 550 may be compensated separately for red pixels 568, green pixels 566 and blue pixels 570 by changing the width and/or height of the sub-aperture as shown for example in FIG. 21. Similarly in the embodiments shown in FIGS. 12 and 13, the same effect may be achieved by varying the horizontal width or vertical height of the sub-apertures 526, 528 and 530. In particular, the sub-apertures 526, 528 and 530 will be the same for each colour but different for different colours.

Figure 22:
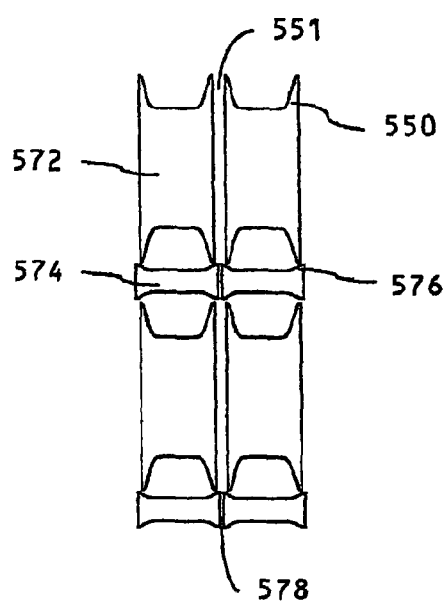
FIG. 22 shows a transflective pixel arrangement of the invention.

FIG. 22 shows a transflective display embodiment of the invention. The sub-pixel comprises transmissive pixel aperture 572 comprising aperture regions 550 to compensate for gap regions 551. Additional reflective pixel apertures 574 comprising aperture regions 576 are incorporated. Reflective pixels facilitate the routing of electrodes under the pixel aperture, and so the gap 578 maybe smaller than the gap 551. The regions 576 are adjusted to compensate for the different gap width. As described previously, additional gaps may be used to divide the gap into smaller portions.

Figure 23A:
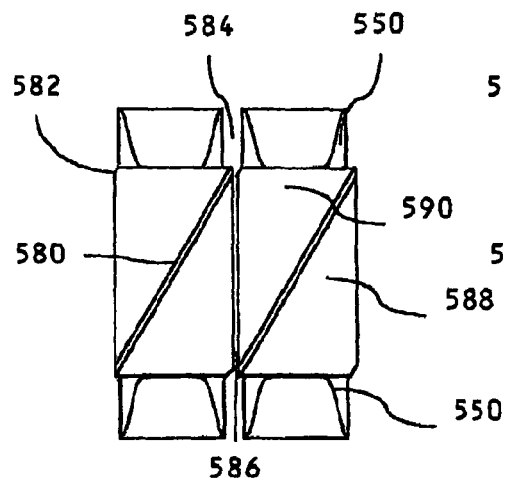
FIG. 23 shows the structure of a pixel of the invention.
Figure 23B:
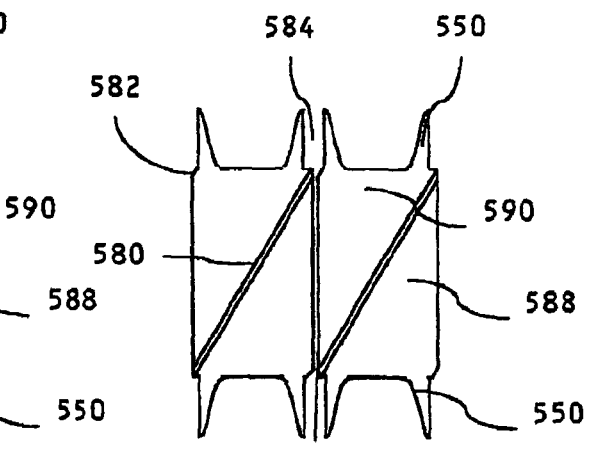

FIG. 23a shows a further embodiment of the invention in which the gaps between the pixel columns 586 may be reduced by means of a diagonally extending electrode 580. A cut-out region 582 is incorporated to compensate for the diagonal electrode aperture. Sub-aperture regions 550 are incorporated to cooperate with the illumination spot to cancel the sub-pixel gaps 584 and 586. The sub-pixel has sub-aperture regions 588 and 590. The pixel shape with construction lines removed is shown in FIG. 23b for clarity.

In this way, these pixel arrangements allow the generation of uniform intensity across at least two windows in the window plane of an autostereoscopic 3D display. This can advantageously be used to extend the viewing freedom of the display while reducing or removing display flicker. The windows may contain different view data, or adjacent windows may contain the same view data and be used in cooperation with an observer position measurement sensor so that the viewer sees a stereoscopic 3D image for an extended range of viewing positions.

The pixel arrangements have been described above as providing a constant intensity as the observer's eye moves across the window plane. In practice, some variation may actually remain. Nonetheless the pixel arrangements can be used to reduce that variation. In practice, a typical variation in the convolution described above for a pixel arrangement of the known type shown in FIG. 11a will be of the order of 10%. The present invention allows a reduction to 5% and below.

A minimum useful window size may be 25% of total window pitch; for example 16 mm lateral freedom for a 65 mm window pitch. To maintain a comfortable level of cross talk (for example 5% or below) over this viewing freedom for an observer moving within a single window it is desirable that the nominal spot width is less than 75% of the pixel pitch, and preferably less than 50% of the pixel pitch.

In an example prior art display system in which the pixel pitch is 60 µm, with a 15 µm gap between the pixels, the maximum spot width that can be used before substantial levels of cross talk are produced over a useful lateral viewing freedom is of the order of 45 µm. Assuming a substantially top hat spot function, the maximum convoluted intensity produced will be 45 units, and the minimum convoluted intensity will be 30 units. The variation of the convoluted spot intensity compared to the maximum intensity is thus at best 33%. One measured display system constructed has a viewing freedom of greater than 30 mm for cross talk of less than 5% and intensity variations of greater than 40%.

In another example using 60 µm pixel pitch, for a gap width limited by liquid crystal cell thickness of 5 µm, the maximum intensity is 45 units and the minimum intensity will be 40 units. The variations of the convoluted spot intensity compared to the maximum intensity is thus 11%. In fact, the spot will not be a perfect top hat function, so that the variation will be larger than this.

In order to reduce the intensity variation, prior art systems are required to increase the spot size, so that the cross talk will increase and the viewing freedom will reduce below a useful level.

Thus, 10% is considered the best variation of the convoluted spot intensity compared to the maximum intensity that the prior art systems can achieve while maintaining adequate viewing freedom.

The pixel shapes of this invention advantageously allow a smaller nominal spot size to be used thus increasing viewing freedom and reducing cross talk while reducing the variation of viewing window visibility for an observer moving in the window plane. Vertically extending gaps between columns allow further reduction of the area of cross talk for the case in which the illuminating spot is close to the boundary between the pixels.

FIG. 24 shows a multiple window autostereoscopic display of the invention in which four pixel columns of a stripe colour filter display are placed under each lens of the array as an example of a display for a multiple window viewing system. The pixels comprise an array of columns of red 603, green 604 and blue 606 pixel apertures, arranged in columns. Under the lens 600 lies red, green, blue and red pixels; lens 601 has green, blue, red and green pixel columns while lens 602 has blue, red, green and blue pixel columns. Each respective column is given a view number 608. The views may be respective views of a scene, or views 1 and 2 may be right eye views and views 3 and 4 may be left eye views.

The lens 600 produces an image of the observer's pupil 610 which maybe close to a top-hat function. The width of the spot 610 may be set to be substantially the same as the pitch of the pixel. The lenses 601 and 602 produce spots 612 and 614 for the right eye, and left eye spots 612,614,616 are produced by the lenses 600,601, 602 respectively.

In the current example, the windows are set to be 32.5 mm separation as shown in FIG. 25. The display 626 output light 627 produces an array of windows 628-634 in the zeroth order lobe. In the central viewing position, the observer places their left eye 638 at intersection of windows 630 and 628, and their right eye 636 at the intersection of window 632 and 634. As the nominal eye separation is at a point in which the geometric image of the black mask is formed, this may lead to an intensity drop compared to the position in the centre of each of the windows 630,628. However, as the spot size is set to be substantially the same as the pixel pitch, the intensity fluctuation is not substantially present, as for all spot positions, the intensity is nominally constant.

Each of the windows 628-634 comprises an array of coloured windows for each lens. Thus for lens 600, window 628 is red, 630 is green, 632 is blue and 634 is red. However, for the adjacent lens 601, the windows have different colours, and again for lens 602. Thus over the three lenses 600-602, a white window is produced at the window plane.

The advantage of this approach is that thicker glass substrates may be used in the display construction, as the window size from each pixel is reduced. Thicker substrates are easier to handle in manufacturing, have higher yield and thus can produce cheaper display devices.

The viewing freedom of the display at the window plane is described in FIG. 26 in which the views 1 and 2 are right eye views and the views 3 and 4 are left eye views. As the observer moves in the window plane, the position of the array 622 of eye spots moves at the pixel plane. As the observer moves to the left, the array 622, moves to the right, and vice versa. The lateral viewing freedom of the display is defined by the point at which the cross talk between the left and right images exceeds a certain value, for example 5%. This occurs when the array of spots 622 starts to cover the opposite view pixels. Thus, the viewing freedom 624 in which the cross talk is sufficiently low is set by the size of the eye spots at the pixel plane. If the eye spots are reduced in size then the viewing freedom increases correspondingly.

Figure 27:
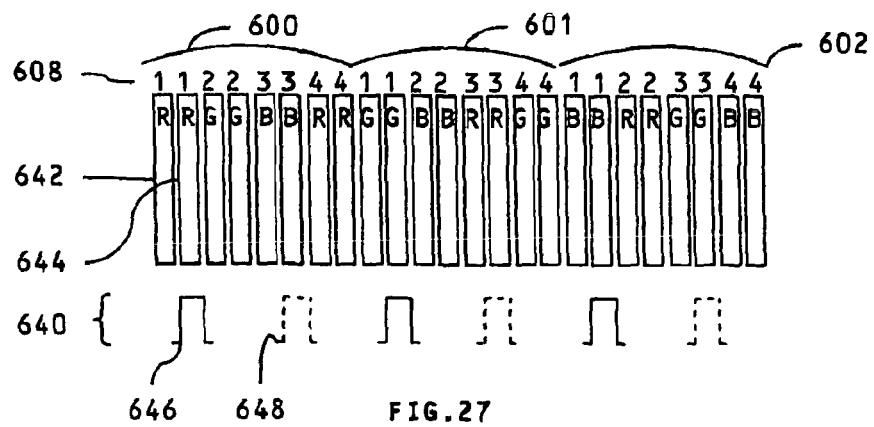
FIG. 27 shows divided pixel columns to reduce the eye spot size in a multiple window imaging system.

Such a display can have an enhanced viewing freedom as described elsewhere in the application, for example as shown in FIG. 27. In this case, each of the pixel columns are divided in to two sub-columns 642,644 which are addressed with the same data 608. Smaller eye spots 646,648 can be used while maintaining the intensity uniformity across the window plane. This gives a larger viewing freedom in the display, and improves the quality of a tracking display.

If the eye spot is not a top-hat function, further modifications can be made to the pixel structure to minimise the intensity fluctuation at the window boundary, as described elsewhere in this application.

Figure 28A:
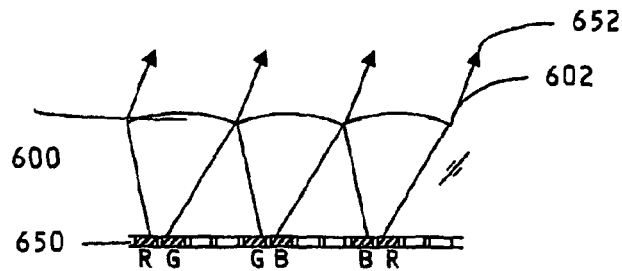
FIG. 28 shows the appearance of the display for a first viewing position.
Figure 28B:
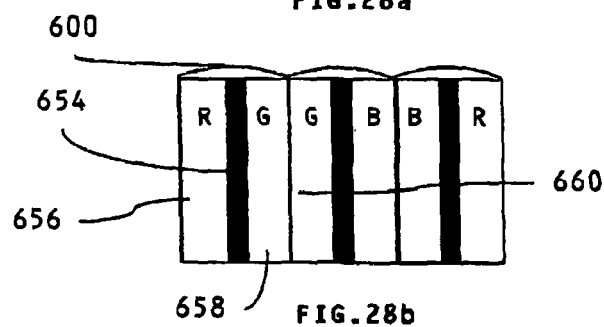
Figures 29A, 29B:
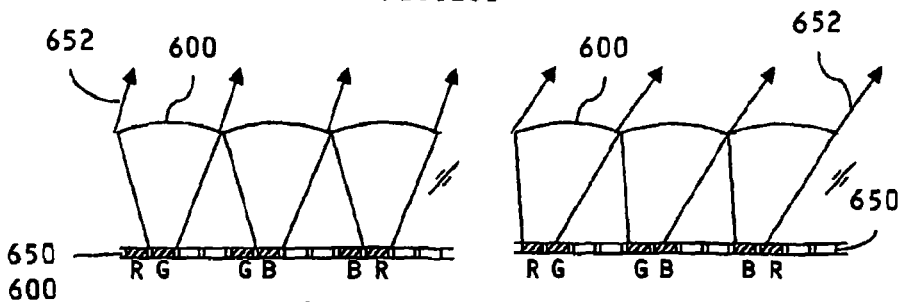
FIG. 29 shows the appearance of the display for second and third viewing positions.
Figures 29C, 29D:
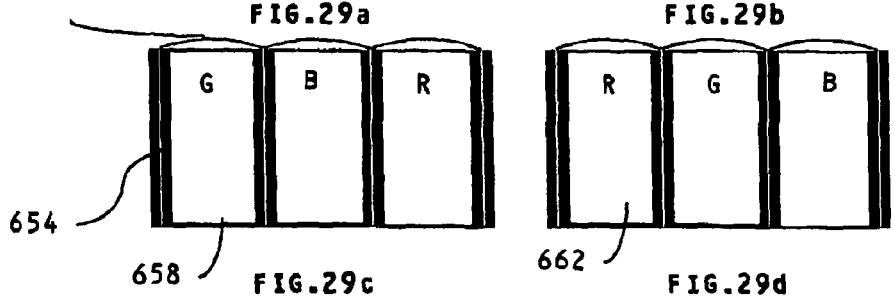

FIG. 28a shows in cross section the imaging light bundles 652 from the pixel plane 650 by the lens array 600-602. FIG. 28b shows the appearance of the image as seen by an observer at the window plane of FIG. 24. In the centre of the lens 600, the viewer will see an image of the black mask 654 with a red pixel 656 and green pixel 658. Over the three lenses 600-602, a white pixel is produced for each of the window positions. FIG. 29a and FIG. 29b show in cross section the imaging of light 652 from the display for an observer at the edges of the viewing freedom of the display. FIG. 29c and FIG. 29d show the appearance of the images as seen by an observer at the window plane in FIG. 26a and FIG. 26b respectively. In lens 600 of FIG. 29c, the lens is green 658 in the middle of the lens and images the black mask region 654 at the edges of the lens. Similarly the lens 600 of FIG. 29d has red light 662 over most of its area, with black mask image at the edges.

In the case of a display incorporating the structure shown in FIGS. 24 and 27, the lens 600 may also cover three pixel columns for example. In that case, there may be a red pixel in each view 1, a green pixel in each view 2 and a blue pixel in each view 3. Clearly, this would be undesirable and can be compensated for by arranging colour filter patterns to not repeat on a three column pattern.

Figure 30:
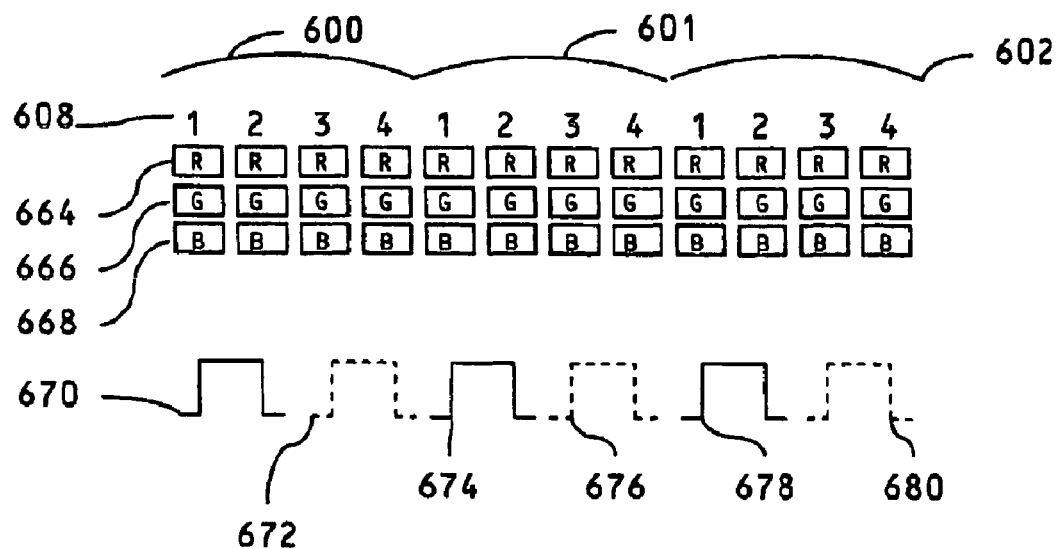
FIG. 30 shows a further embodiment of the invention in which the colour pixels are arranged as rows.

One further embodiment of the invention is shown in FIG. 30 in which the coloured pixels are arranged in red 664, green 666 and blue 668 rows while the lenses 600,601,602 are arranged in columns. In this case, a four view system would have functions 670,674,678 for right pupil images at the pixel plane and 672,676,680 for left pupil images at the pixel plane to minimise intensity variations, as described elsewhere in the application.

In general, the pitch of the windows in the nominal window plane may be equal to the nominal interocular separation of an observer, but is advantageously less than the nominal interocular separation, preferably less than a minimum interocular separation. For example, the window pitch may be substantially two-thirds or half of the nominal interocular separation. Human interocular separations generally range from 55-68 mm and are typically in the range 60-65 mm. A nominal interocular separation may thus be taken as 65 mm and a minimum window separation may be taken as 55 mm. The window separation than 32.5 mm in the above example.

Figure 31:
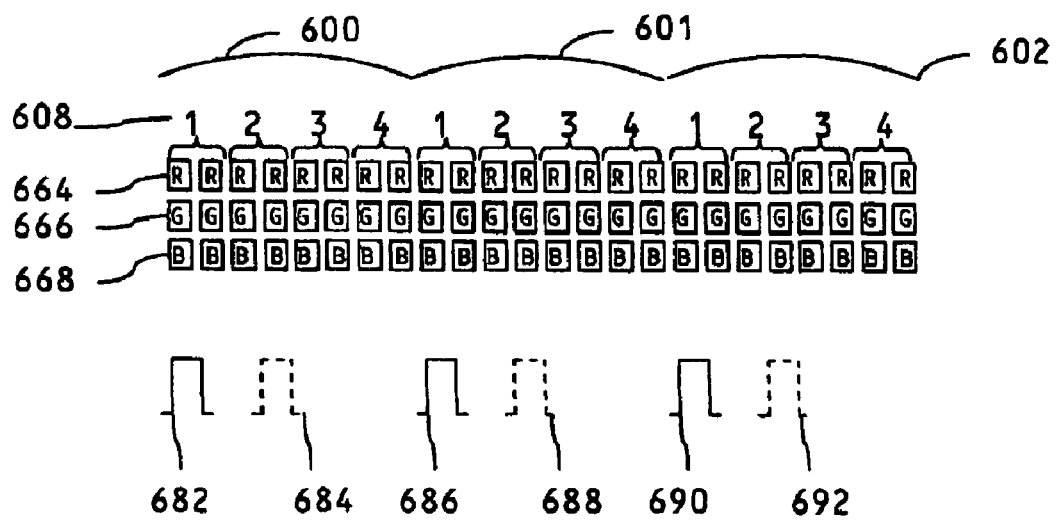
FIG. 31 shows a further embodiment of the invention in which the pixels are arranged as rows and are subdivided.

FIG. 31 shows an alternative embodiment in which the pixel data columns are divided into two pixel aperture columns, as described elsewhere in the application. In this case, two viewing windows are produced for each data column. In such a system, the images 682,686,690 and 684,688,692 of the pupils at the pixel plane may be set to be smaller than the images shown in FIG. 30. In this case, the viewing windows are formed from the pixel apertures rather than the pixel data columns.

The size of the eye spots may be therefore smaller than in the apparatus of FIG. 30 while substantially maintaining uniform intensity across the window plane. Thus, in untracked multiple window displays in which the data on the view columns is not changed in correspondence with the observer movement, the display can advantageously have a wider viewing freedom than the display of FIG. 30. Further, the display can advantageously have lower cross talk, because the 'tails' of the images of the pupils are relatively smaller, meaning that less light can be collected by an eye from adjacent view data columns.

Whilst the arrangements shown in FIGS. 24 to 28 use pixels of constant height in which the pixel pitch is equal to a representative width of the spot, they could equally be applied to pixels shaped to limit the intensity variation, in the same manner as the arrangements of FIGS. 14 to 23.

The invention claimed is:

1. An autostereoscopic display apparatus comprising:
   a spatial light modulator comprising an array of pixels arranged in rows and columns in a pixel plane, the pixels comprising pixel apertures having gaps therebetween with the gaps between the columns of pixels extending substantially parallel to the columns of pixels; and
   a spatially multiplexing parallax element capable of directing light from successive columns of pixels towards successive ones of two or more viewing windows in a nominal window plane,
   wherein the total height of the pixel apertures parallel to the columns of pixels varies, and has a profile which increases towards opposite edges of the same pixel aperture relative to the center of the pixel aperture on one side, wherein the opposite edges of the pixel aperture are opposite in a direction substantially perpendicular to the columnar direction of the pixels.

2. A display apparatus according to claim 1, wherein the total height of the pixel apertures parallel to the columns of pixels has a profile which has a flat central portion.

3. A display apparatus according to claim 1, wherein the rows and columns are perpendicular to each other.

4. A display apparatus according to claim 1, wherein the display apparatus is switchable between a first mode in which the spatially multiplexing parallax element is effective to direct light from successive columns of pixels towards an alternate one of two viewing windows and a second mode in which the spatially multiplexing parallax element has no effect.

5. A display apparatus according to claim 1, wherein the spatially multiplexing parallax element has a structure which is uniform in a direction parallel to the columns of pixels and which repeats in a direction parallel to the rows of pixels.

6. A display apparatus according to claim 1, wherein the spatially multiplexing parallax element is a lenticular array.

7. A display apparatus according to claim 1, wherein the spatially multiplexing parallax element has a structure which repeats at a pitch which is substantially an integer multiple of the pitch of the columns of the array of pixels.

8. A display apparatus according to claim 1, wherein a pitch of the windows in the nominal window plane is less than 55 mm.

9. A display apparatus according to claim 1, wherein the pixel apertures of pixels of each colour have substantially the same, constant total height parallel to the columns of pixels.

10. A display apparatus according to claim 9, wherein the pixel apertures of pixels of different colours have substantially the same total height parallel to the columns of pixels.

11. A display apparatus according to claim 1, wherein the pixel apertures of pixels of each colour have substantially the same width perpendicular to the columns.

12. A display apparatus according to claim 11, wherein the pixel apertures of pixels of different colours have substantially the same width.

13. A display apparatus according to claim 11, wherein the pixel apertures of pixels of different colours have different widths to compensate for chromatic aberration.

14. A display apparatus according to claim 1, wherein along the rows of pixels, the pixels are arranged in groups consisting of a plurality of adjacent pixels of the same colour.

15. A display apparatus according to claim 14, wherein the pixels of each group are commonly addressable.

16. A display apparatus according to claim 1, wherein the total height of the pixel apertures parallel to the columns of pixels varies.

* * * * *